Figure 1:
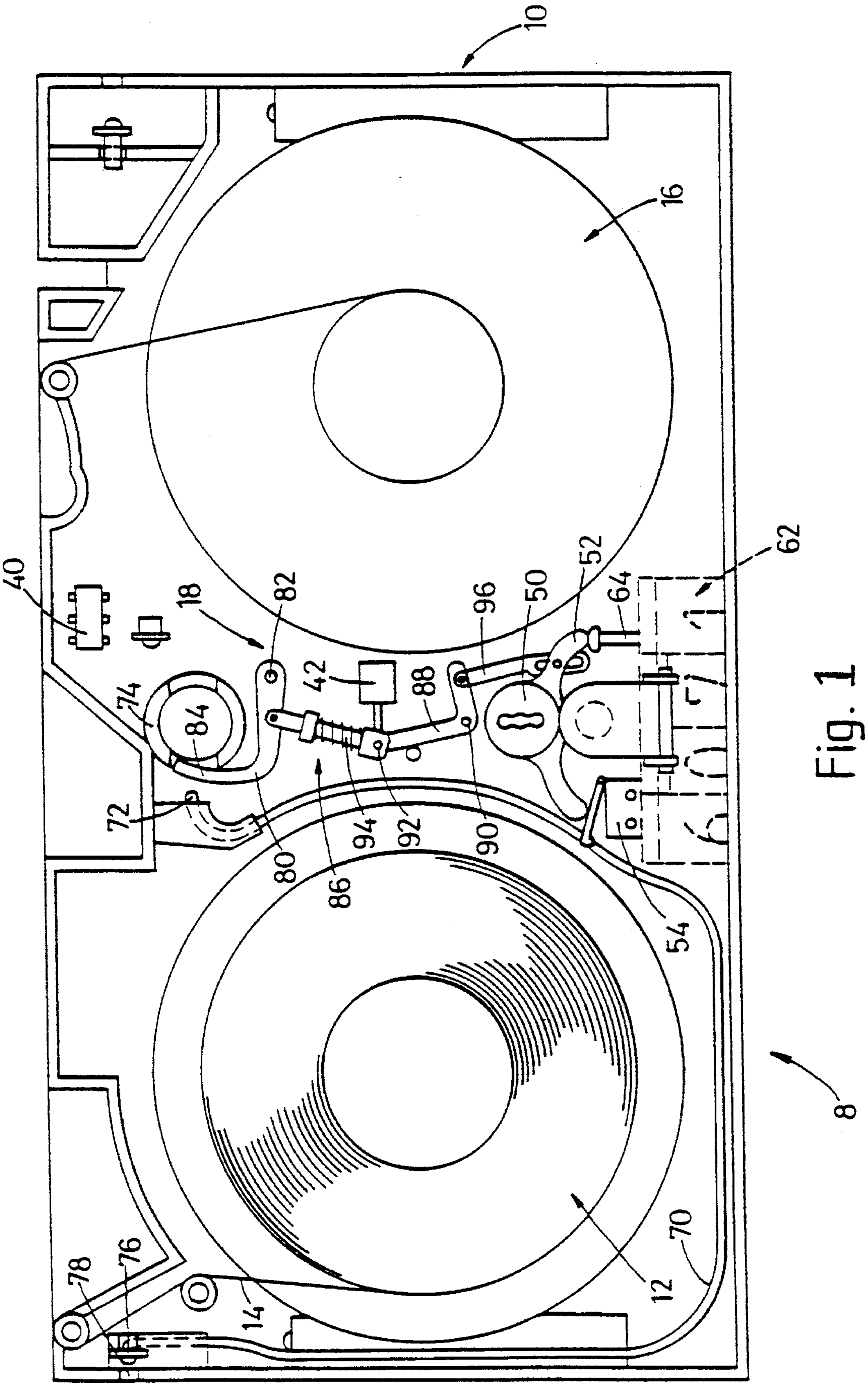

US005592550A

United States Patent [19]

Davis et al.

[11] Patent Number: 5,592,550

[45] Date of Patent: Jan. 7, 1997

[54] VIDEO CASSETTES AND OTHER PRE-RECORDED MEDIA CARTRIDGES

[75] Inventors: Raymond L. Davis; Michael J. Swift, both of West Midlands, United Kingdom

[73] Assignee: Shapecourt Limited, Birmingham, United Kingdom

[21] Appl. No.: 347,337

[22] PCT Filed: Jun. 1, 1993

[86] PCT No.: PCT/GB93/01163

§ 371 Date: Dec. 2, 1994

§ 102(e) Date: Dec. 2, 1994

[87] PCT Pub. No.: WO93/26010

PCT Pub. Date: Dec. 23, 1993

[30] Foreign Application Priority Data

Jun. 5, 1992 [GB] United Kingdom .................. 9211984

[51] Int. Cl.$^{6}$ .................................. H04N 7/167

[52] U.S. Cl. .............................. 380/5; 360/132; 360/66

[58] Field of Search .............................. 380/5; 360/132, 360/66

[56] References Cited

U.S. PATENT DOCUMENTS 5,023,741 6/1991 Conti et al. ............................ 360/132

*Primary Examiner*—David C. Cain
*Attorney, Agent, or Firm*—Learman & McCulloch

[57] ABSTRACT

A carriage assembly embodying pre-recorded media such as tape or film, and typically a VHS or other standard reel-type video cassette, incorporate built-in self-contained control means. This includes a timer operable to define a pre-set user period, e.g. a hire period from a video library, during which normal replay and other operation of the assembly can take place, and inhibiting means, for example an electrically powered oscillator automatically activated at the end of the period to prevent or inhibit replay or other operation, in the case of the oscillator by emitting a signal picked up by the play back head of the user's equipment so that the image and/or sound is degraded and "jammed." In alternative constructions the inhibiting means act on mechanism of the assembly itself or its interfacing with the equipment to prevent further playback. A counter or other register or memory means may also be incorporated to record usage. The timer can only be reset by use of a code key device.

14 Claims, 2 Drawing Sheets

VIDEO CASSETTES AND OTHER PRE-RECORDED MEDIA CARTRIDGES

This invention relates to cassettes or other cartridges operatively embodying pre-recorded media such as tape or film, particularly but not exclusively magnetic video tape; or embodying solid state pre-recorded media such as ROM chips or optically scanned ROM or other "Compact Discs" or the like.

More specifically the invention applies to a cartridge assembly (hereinafter referred to as "a cartridge assembly of the kind described") comprising a tamper-resistant housing containing a medium which has been pre-recorded in use, and interfacing means whereby the cartridge will interact with compatible operating equipment for selective replay.

A cartridge assembly of the type hereinafter referred to as a "reel-type cassette" will have medium in the form of a tape or film carried on main and take up reels within the housing, the operating equipment driving the reels for winding the medium forward off the main onto the take-up reel during replay, and for rewinding the medium ready for further replay.

The invention is particularly usefully embodied in reel-type cassettes which incorporate or are compatible with the widely used VHS system which is now the almost universal standard for video cassette recorders in general use in the home and elsewhere and hence for video tape recordings on general sale and/or available for loan or hire from video libraries. The VHS system and the construction of the standard cassettes used therewith is well known in the art and will not be described in any detail.

The object of the invention is to provide a reel-type cassette or other cartridge assembly of the kind described in a form which provides control and monitoring of its usage in an effective, convenient and economical manner so as to provide fairer and more effective remuneration of the originators or providers of prerecorded media without undue restriction or inconvenience for the end user.

According to the invention there is provided a cartridge assembly as defined by claim 1 of the appended claims.

Preferably said inhibiting means operates by generating and emitting a continuous or intermittent signal which will interact with the replay system of the equipment to degrade or "jam" output as it is played back from the cartridge medium e.g. by rendering it substantially unwatchable or inaudible. Said signal may also be utilised to deter and/or detect unauthorised removal of the assembly from a location, e.g. by sounding an alarm if it is taken through a door provided with detector equipment.

Alternatively said inhibiting means may operate by direct or indirect interaction with the tape or other medium transport system of the equipment in which the cartridge is used, for example by simulating an "end of tape" optical signal to optical detector means of a VHS cassette player so that at least forward tape transport is inhibited.

Preferably said timer and inhibiting means form parts of control means of the cassette or other cartridge, the latter means further including a lock module operable only by a coded key or key input signal for starting the timer to commence said period.

The control means may further include memory means having a digital or other register totalising the number of said periods started or otherwise recording usage or operation of the assembly; and with a read-out facility for selectively extracting data from the register. An input facility, preferably secured by key or coded access, may also be provided to adjust, set or reset the register.

The term "coded key or key input signal" used herein is intended to comprise inter alia conventional mechanical keys cut to a predetermined code for physical insertion into and operation of a lock module of the control means, e.g. coacting with a cylinder-type lock; visibly or invisibly coded magnetic or optically read keys in card or other form for actuating an electromagnetic or electro-optical lock module; key signal generating or input devices transmitting coded pulses to a lock module e.g. remote infra-red key input signal devices; or input to combination or like lock modules by manual keying in or otherwise inputting a digital or other code. Said memory means of the assembly may conveniently be programmed and/or otherwise adapted to provide this function.

Figure 2:
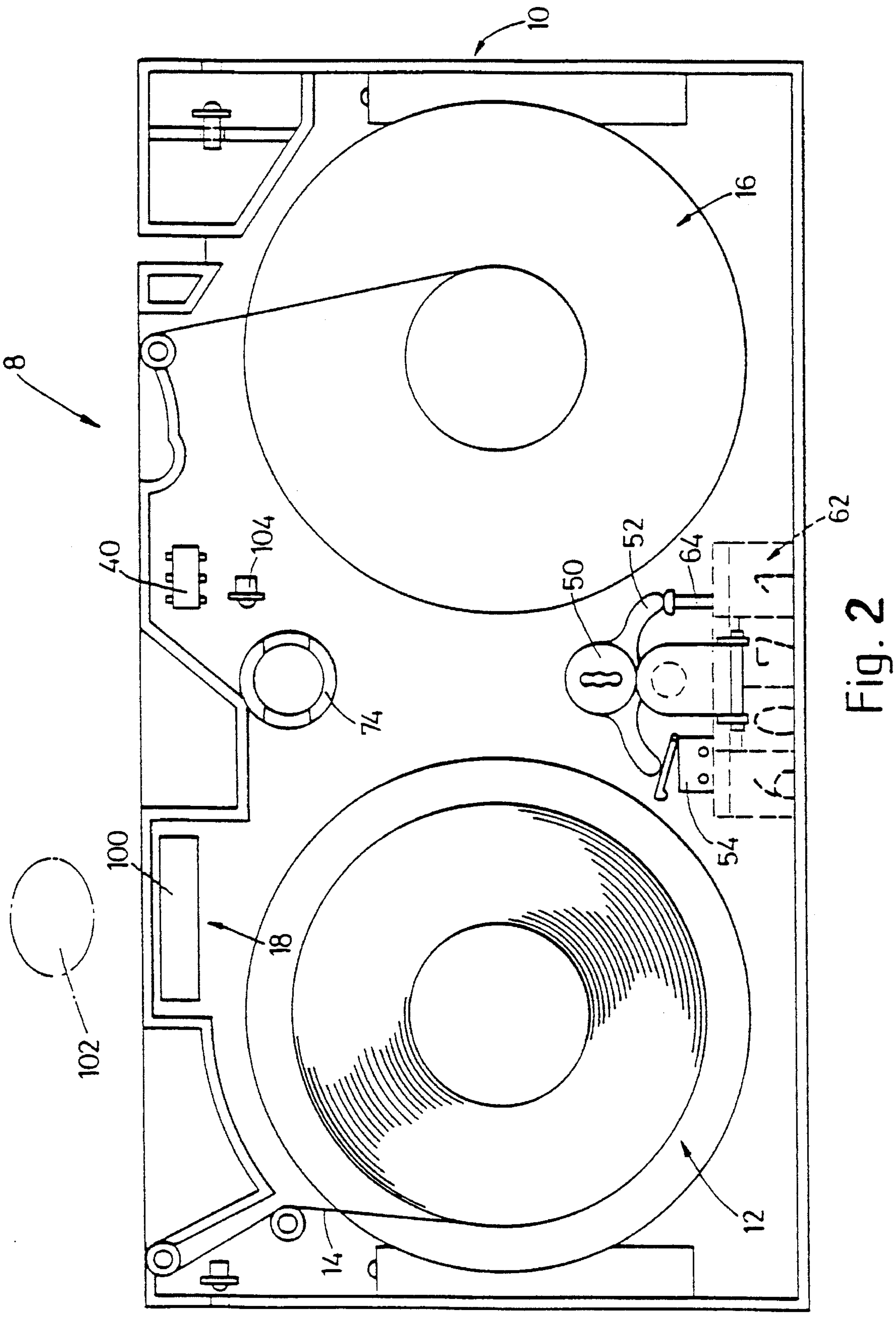

Embodiments of the invention are now described in further detail with reference to the accompanying drawings wherein:

FIG. 1 is a diagrammatic horizontal sectional view of part of a VHS compatible video cassette incorporating a first form of timer regulated control means, and FIG. 2 is a like view of a cassette incorporating a second form of said means.

In all the Figures the VHS cassette assembly 8 shown comprises a unitary tamper-proof housing 10 within which is a main tape reel 12 on which is operatively wound a video tape 14 which, in use, will have been pre-recorded, e.g. with a feature film to be hired or loaned from a video library. Housing 10 further contains a take-up reel 16 with the leading end of tape 14 anchored to its central hub after being led round guide rollers and through apertures of the assembly between the reels in known manner to cooperate with and for operation in VHS type record and playback operating equipment (not shown).

Located in the housing generally between the reels 12 and 16 is timer regulated control means 18 a first form of which is now described in greater detail with reference to FIG. 1.

Said control means includes a built-in solid-state timer chip 40 powered from a miniature expendable (or possibly re-chargeable) battery (not shown) also built into the cassette. The timer will be arranged to run for a pre-determined period, typically a 24 hour user period though other pre-determined lengths of period may be provided and, in some applications, provision may be made for altering the length of said period by adjustment of setting means preferably secure within the housing so as to be inaccessible to unauthorised persons.

In order to reset, i.e. zero, the timer and start it running again and at the same time clear or reset the brake or other inhibiting means a key operated lock is incorporated.

In the present example this takes the form of a small cylinder-type lock 50 accessible through the top wall of the housing 10 between reels 12 and 16.

The inner end of the lock cylinder carries a two-lobed cam 52 which, when the cylinder is rotated by means of the key anticlockwise as viewed in the drawings, closes the contacts of a micro-switch 54. This triggers timer 40 to commence the next user period. At the same time a reset link 96 connected with the inhibition means described below is shifted to restore said means to the FIG. 1 condition. The lock cylinder is resiliently sprung to return it to a central rest position for withdrawal of the key.

The video library will hold the key (which will usually be standard to a number of cassette assemblies) so that only the library can reset the control means and start the timer to allow further replays of the tape in the next user period i.e. on further lending or hiring to the same or another end user.

A miniature multi-drum (e.g. reading up to 9999 or 999) cyclometer type mechanical register counter 62 similar to those used on audiotape recorders is mounted within housing 10 adjacent its front wall and readable visually through a small window in the front or top wall of the housing. The other lobe of the lock cam 52 engages an operating plunger 64 of counter 52 holding it inwardly. On turning the key to start the timer and reset the inhibiting mechanism and then returning cam 52 to its centre position the counter will be shifted by one unit. In this embodiment the counter moves forward only, registering the total of timing periods started. The mechanism is not accessible to the user to prevent tampering, nor is any facility provided for resetting the counter to zero. However in some applications a secured zeroing facility might be provided.

In the preferred arrangement the registered total count will remain as a substantially permanent record of usage of the tape (in terms of the number of timed periods initiated) in a similar way to the odometer recorded travel of a road vehicle.

It will be noted that the timer controlled arrangement permits unrestricted rewind and replay of the tape during the preset user period (e.g. 24 hours). This arrangement is considered more acceptable and "user friendly" than previously proposed control systems which prevent or limit rewinding or further replay after a first run through. A user may not wish to watch a film all through at one sitting or may be disturbed e.g. by a telephone call while watching and may therefore require to go back a short way to re-establish the continuity of viewing. All members of a household having a film may not be able to watch it together, or some may wish to see it twice or more in the hire period.

The inhibiting means, which operates by interaction with the control or operating system of the play back equipment, of the FIG. 1 embodiment is now described.

The cassette incorporates a light transmitting device in the form of a fibre optic light conductor 70 mounted within housing 10 to extend in a path generally around the periphery of a major portion of reel 12 and having an input end 72 carried in a fixed mounting closely adjacent to the central hollow boss 74 which is part of the standard VHS format. An output end 76 of conductor 70 also locates in a fixed mounting in alignment with the standard aperture 78 in a side wall of the housing. The optical control of standard VHS equipment with which the cassette will be used, e.g. a standard domestic VHS video cassette recorder, includes a visible or infra-red source which projects into boss 74 when the cassette is loaded to provide a beam of light directed to the left as viewed in FIG. 1 in alignment with said aperture 78 in the housing wall.

Normally this direct beam is intercepted by the flight of tape 14 leading from reel 12 so that light only reaches aperture 21 when a transparent leader portion of the tape intersects the beam. This provides an "end of tape" signal to the tape transport system of the equipment to prevent further tape winding which might otherwise cause damage.

The light conductor 70 bypasses the tape path so that light can be conducted from the source in boss 74 to the output read by the equipment regardless of the tape position on the reels.

The inhibiting means further includes a shutter lever 80 hinged on fixed pivot 82 alongside boss 74 within housing 10, the free end of which carries a shutter formation 84 which, in the position shown in FIG. 1, closes the left hand aperture in boss 74 to prevent light reaching the input end 72 of conductor 70.

Lever 80 is resiliently retained in this position by a toggle linkage 86 having a reaction link 88 hinged at one end on a further fixed pivot 90 and connected at its other end by a knuckle joint 92 to a spring loaded plunger 94, in turn pivoted to a mid-part of lever 80.

A solenoid 42 is connected to knuckle joint 92 whereby, when briefly energised, it will pull the knuckle joint to the right so collapsing the linkage and shifting shutter formation 84 clear of boss 74 allowing light to reach the output end 76 to be read by the equipment. This collapse takes place at the end of the preset use period determined by timer 40 as described above, thus when the cassette is in the equipment in the time expired condition light is emitted continuously from output end 76 so that the equipment reads the continuous "end of tape" condition preventing winding and therefore further replay or other use of the cassette.

Resetting, and commencement of a fresh user period, is carried out using a key in the lock 50 as already described, cam 52 co-acting with switch 54 to turn on the timer, and, at the same time, moving the counter on by one increment. Operation of the key also resets the toggle linkage 86 to the FIG. 1 condition in which light is blocked by the shutter formation by means of the previously mentioned setting link 96 having slotted connection with cam 52 and acting on a crank arm of reaction link 88.

This first embodiment has advantages for some applications, it is simple and reliable in operation, it does not involve any braking or interference with the reels and tape itself, and the additional mechanism to be installed in the cassette is light-duty and therefore compact and economical to produce as it does not have to carry braking or blocking loads. A disadvantage is that it is fairly simple to override the inhibiting action, a user may block off the aperture 78 in the housing wall to prevent the light signal being emitted and the consequence of this may be damage to the tape as overwinding is uncontrolled. It may also damage the users' equipment but not all users will be deterred by this.

FIG. 2 shows a second embodiment incorporating an inhibiting means which does not, in itself, involve any moving parts, is particularly simple and reliable in operation, and substantially tamper-proof. Again parts common to the other embodiments are given the same reference numerals.

The cassette incorporates a small electrical oscillator 100 positioned in a rear part of housing 10 adjacent to reel 12 where it will be in close proximity to the play back head (shown diagrammatically in broken lines at 102) which reads the audio and visual signal recorded on the tape when the cassette is operating in the equipment. The signal generated and emitted by the oscillator will not damage the recorded tape itself but provides jamming "noise" which will be picked up by head 92 to overlie the signals from the tape thus substantially degrading or making unwatchable or inaudible the picture and/or sound during playback. The signal is also detectable by suitable equipment up to some distance from the cassette.

Oscillator 90 is powered from the internal battery in the cassette which also powers the timer 40. The oscillator will be switched on when the user period defined by the timer ends, so preventing any further intelligible or useful playback though normal operation in terms of rewind or forward wind etc. of the cassette is not in any way inhibited. With this arrangement the timer may have provision for setting the start of said period at a predetermined future time as well as its duration, and the oscillator will preferably be in operation at all times outside that period. This enables said signal to be used as security against pilfering or unauthorised removal of a cassette, e.g. a detector will sound an alarm if a cassette is taken through a shop doorway or exit without having been cleared by resetting using the key facility.

An oscillator for this purpose will operate on very low current, however, to provide longer battery life, it may be operated intermittently in short bursts.

To provide longer battery life, if the security facility is not required, the cassette may be provided with a light responsive sensor 104 adjacent one of the openings in the boss 74 which contains the light source of the equipment referred to in connection with FIG. 1 when the cassette is in place therein. The oscillator 100 is only powered when sensor 104 is activated by the light source. Thus no current is consumed when the cassette is not in the equipment, even if the user period has run out.

Many commercial hired cassettes have a relatively short shelf life and a battery life ensuring operation in the above way for upwards of twelve weeks or so will be acceptable for many applications, thus an inexpensive battery can be used. For more long term applications a rechargeable battery might be employed with the possibility of the cassettes being put on charge whilst they are in storage at the video library.

It is contemplated that the cassette will normally have the control means fitted at the time of manufacture, but the housings or casings thereof may be formed, e.g. moulded, to provide locations for later fitting of the appropriate components if required, these being press or snap-fitted at a final assembly stage which may possibly be carried out by the commercial recording or copying studio or the hire library, or library supply wholesaler. Blank tapes for subsequent recording may be supplied with the control means ready fitted, and the latter may be made as a miniaturised self-contained sub-unit, e.g. mounted on a common PCB.

To enlarge further on the system of use of the cassettes or the like incorporating the invention, it is contemplated that an originator, main distributor or other provider of bulk pre-recorded tapes, e.g. a film production or distribution company, will distribute them to video libraries and other intermediate distributors or outlets in bulk noting the registered counter totals of the cassettes as they are delivered.

The library or other outlet (which could be a supermarket, small shop or even a home agency, possibly supplied by post) will in turn hire out or lend the tapes in the usual way. However, the effective loan or hire period is positively determined by the timer, if the borrower requires further viewing the tape will have to be returned to the outlet for the key to be used to reset the control means (and incidentally, the counter will be advanced accordingly).

When the tapes are returned to the main distributor or other provider the number of loan periods can be read off from the registered total of the counters and charging to the intermediate distributor or outlet can be based on this number. Alternatively the provider may call round at the libraries or other outlet premises to check on the tapes in stock, exchange and update the selection and at the same time collect the charges e.g. at weekly or monthly intervals.

Another important aspect commercially of the described arrangement is that the main distributor or other provider is able to have a reliable assessment of how popular or unpopular particular films are and can tailor the material provided much more closely to market demand which should enable substantially more profitable operation, unpopular films which are taking up shelf space can be withdrawn and extra copies of popular lines can be readily provided.

The "turn round" time of the tapes will be quicker as a borrower has no incentive to keep them once the period has expired. A borrower cannot "cheat" by keeping a tape in high demand for extra time and viewing while other bookings are kept waiting.

The use of the invention may also make a valuable contribution to the continuing problem of fair return and enforcement of copyright for authors, film producers and the like as a royalty which is directly related to the number of hirings can readily be calculated, included as a percentage of the hiring charges which will be passed along the line to the ultimate user, and can be accounted for reliably and quickly to those entitled to the royalties.

The timer based control systems or means described above can readily be incorporated into the standard type of VHS video cassette without undue difficulty or complication and are simple and reliable in use. It is believed that, although there will be some addition to the cost of the cassette hardware, any increase will readily be recouped and covered by the more efficient collection of hire charges and that cassettes incorporating the invention will be commercially feasible even if they are regarded as disposable items once the video film or other material has reached the end of its life.

Provision could be incorporated for resetting the counter to zero e.g. by means of another key operated mechanism, though for most practical applications it is anticipated that this will not be necessary, indeed the usual hiring life of a feature film is somewhat less than the 999 maximum total provided by a three digit counter.

The facility allowing rewinding by the end user is preferred because it is common practice to require the hirer or borrower to rewind the tape before return to save the library or other outlet the time and trouble of doing so and this requirement will be particularly convenient where the outlet is, for example, a supermarket where minimum handling and processing is essential for efficient operation. However, as described above, the mechanism can readily by arranged to prevent winding of the tape in either or both directions once inhibition on expiry of the preset period occurs and this may be desirable in some applications.

While it is anticipated that the primary use of the invention will be in connection with pre-recorded video tapes it is contemplated that it may have other applications where playback of a pre-recorded medium is required to be monitored or controlled, for example in controlling the hire, loan or other usage of pre-programmed computer software e.g. cartridges for computer games consoles, CD ROM or other copyright material, or preventing access to or playback of confidential video or other recordings, computer data tapes or the like as in business, commercial or administrative applications outside predetermined periods e.g. outside working hours.

As referred to above various forms of lock means and coded key or key input signals can be used. Thus a video library having a large number of tape cassettes may operate the lock means of all of them by a commonly coded key or may use a coded magnetic card, optical key or card or infra-red remote key input device, possibly built into or combined with the cash till or other point of hire charging or billing equipment.

The overriding key reset will normally be operable even within the preset period, e.g. if a tape is returned early to a library resetting will cancel the remaining unexpired time and start a fresh period running on re-issue.

Instead of memory means in the form of the mechanical counter register 62 described above, the PCB or other control means of the cassette or assembly may incorporate an electronic memory chip programmed to record usage data such as the number of timer operations and possibly other data. Such memory means may also be programmable for setting or adjusting the timer, interfacing with an electronic read-out device for transfer of the data and input to the memory means in combination with the coded resetting equipment above.

We claim:

1. A cartridge assembly comprising a tamper-resistant housing containing a medium which has been pre-recorded in use, interfacing means whereby the cartridge will interact with compatible operating equipment for operations including replay of a recording carried by the medium, a timer operable to define a pre-set user period during which said operations of the assembly by use of said equipment can take place, and inhibiting means automatically activated outside said period at least at the end thereof to restrict said operations, characterised in that the inhibiting means includes transmitter means for radiating an electromagnetic inhibiting signal externally of the housing without affecting the pre-recorded medium itself, said signal interacting with an operating system of the compatible equipment in use.

2. An assembly as in claim 1 characterised in that the transmitter means includes an electrical oscillator for generating and emitting a signal at radio frequency which interacts directly with playback means of the compatible equipment in use to degrade substantially the output thereof on attempted replay of the medium.

3. An assembly as in claim 2 characterised in that said radio frequency signal is directly picked up by a play back head of the equipment in use.

4. An assembly as in claim 1 characterised in that the transmitter means includes a light directing device for radiating an inhibiting signal from an output to activate a light responsive stop device of the equipment independently of said medium.

5. An assembly as in claim 4 wherein the directing device receives and re-directs light from a light source of the equipment in use.

6. An assembly as in claim 1 characterised in that the timer is a solid state device electrically powered from a battery within the assembly.

7. An assembly as in claim 1 characterised in that the timer and inhibiting means form parts of a control means of the assembly, said control means further including a lock module operable only by a coded key input signal for setting the timer to determine the required user period.

8. An assembly as in claim 7 characterised in that said control means further includes memory means recording usage of the assembly.

9. An assembly as in claim 8 characterised in that said memory means comprises an electronic memory chip and provision for interfacing with a read out device for transfer of recorded usage data from the assembly.

10. An assembly as in claim 1 characterised in that the pre-recorded medium is a video tape.

11. A video cartridge assembly comprising a tamper-resistant housing containing a tape which has been pre-recorded in use, interfacing means whereby the cartridge will interact with compatible play-back equipment for replay of a recording carried by the tape, a timer operable to define a pre-set user period during which said replay can take place, and inhibiting means automatically activated outside said period at least at the end thereof to render said replay substantially impracticable, said inhibiting means including an electrical transmitter device operating to generate a signal at radio frequency radiating beyond the housing so as to interact directly with said play-back equipment causing substantial degradation of replay output.

12. A video cartridge assembly as in claim 11 compatible with play-back equipment incorporating the VHS system.

13. A video cartridge assembly comprising a tamper resistant housing containing a tape which has been pre-recorded in use, interfacing means whereby the cartridge will interact with compatible play-back equipment for replay of a recording carried by the tape, tape transport means operated by the play-back equipment and including a light path within the housing intercepted by a flight of the tape in use and extending from a light source of said equipment which is received in the housing to a light receptor of said equipment to provide an end of tape signal when a transparent leader of the tape is in said path, a timer operable to define a pre-set user period during which said replay can take place, and inhibiting means automatically activated outside said period at least at the end thereof to prevent any said replay, said inhibiting means including a light directing device for conducting light from said source to said receptor bypassing said tape flight to provide an inhibiting signal actuating the play-back equipment in the same way as the end of tape signal to prevent replay independently of the position of the tape.

14. A video cartridge assembly as in claim 13 compatible with pay-back equipment incorporating the VHS system.

* * * * *